(12) United States Patent
Hijazi et al.

(10) Patent No.: US 10,680,432 B2
(45) Date of Patent: Jun. 9, 2020

(54) OVER-VOLTAGE DETECTION AND PORT PROTECTION

(71) Applicant: Dell Products L.P., Round Rock, TX (US)

(72) Inventors: Mohammed Hijazi, Austin, TX (US); Merle J. Wood, III, Round Rock, TX (US); Wei-Cheng Yu, New Taipei (TW); Tsung-Cheng Liao, Taoyuan (TW); Geroncio O. Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 418 days.

(21) Appl. No.: 15/669,490

(22) Filed: Aug. 4, 2017

(65) Prior Publication Data

US 2019/0044322 A1 Feb. 7, 2019

(51) Int. Cl.
| | |
|---|---|
| *H02H 7/00* | (2006.01) |
| *H02H 7/20* | (2006.01) |
| *H02H 3/20* | (2006.01) |
| *G06F 1/26* | (2006.01) |
| *G06F 1/28* | (2006.01) |

(52) U.S. Cl.
CPC .............. *H02H 7/20* (2013.01); *G06F 1/266* (2013.01); *G06F 1/28* (2013.01); *H02H 3/202* (2013.01)

(58) Field of Classification Search
None
See application file for complete search history.

(56) References Cited

U.S. PATENT DOCUMENTS

| | | | | |
|---|---|---|---|---|
| 8,982,520 B2* | 3/2015 | Predtetchenski | ... | G06F 13/4072 361/86 |
| 2014/0103862 A1* | 4/2014 | Ahn | ................... | H03K 3/02335 320/107 |
| 2018/0287366 A1* | 10/2018 | Yeh | ......................... | H02H 3/00 |

* cited by examiner

*Primary Examiner* — Stephen W Jackson
(74) *Attorney, Agent, or Firm* — Norton Rose Fulbright US LLP

(57) ABSTRACT

Redundancy in over-voltage fault protection may be provided by controlling switches already present in a power path of a port for an information handling system. An external device coupled to a port may be decoupled from the system when an over-voltage condition is detected at another port of the information handling system. To decouple an external device upon detection of an over-voltage condition, a switch coupled to the port and the external device is turned off. A battery may also be decoupled from a port upon detection of an over-voltage condition at another port.

20 Claims, 7 Drawing Sheets

OVER-VOLTAGE DETECTION AND PORT PROTECTION

FIELD OF THE DISCLOSURE

The instant disclosure relates to information handling systems. More specifically, portions of this disclosure relate to port protection in information handling systems.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be equipped with ports for coupling to external devices, such as power adaptors, external hard drives, flash drives, external speakers, and the like. Information handling systems may deliver power to and/or receive power from external devices coupled to ports. For example, external power delivering devices may couple to ports of the system in a high-power mode, to deliver power from the external device to the information handling system. External power consuming devices may couple to ports of the system in a low-power mode, to receive power from the information handling system.

An external device coupled to a port of an information handling system may be damaged if voltage, current, and/or power is applied beyond a tolerance of the device. Power path protection circuitry may protect ports of the system and external devices coupled to the ports from damaging voltage, current, and/or power from components within the system, such as a system battery, or external power delivering devices coupled to other ports of the system. Power path protection circuitry may require multiple redundant components to provide backup power protection if a component fails. Redundant components in power protection circuitry, however, can increase cost and size.

Shortcomings mentioned here are only representative and are included simply to highlight that a need exists for improved information handling systems, particularly for power protection circuitry in information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system can protect ports and devices coupled to the ports from reverse current by turning off a switch and decoupling an external power delivering device from the information handling system. The switch may be activated when an over-voltage condition is detected at a port. Power path protection circuitry may be implemented across multiple ports of an information handling system to detect over-voltage conditions and to protect against damage resulting from over-voltage conditions. A first port may include detection circuitry for monitoring for an over-voltage condition on a power path of the first port. Upon detection of an over-voltage condition, the first port may turn off a switch coupled to a second port to decouple an external device coupled to the second port to prevent damage to the first port or an external device coupled to the first port. For example, when a power adaptor is coupled to a USB Type-C port with Power Delivery and an over-voltage condition is detected on another port, a switch may be used to decouple the power adaptor coupled to the USB Type-C port.

Information handling systems may incorporate multiple ports capable of receiving and/or delivering power. Some ports may deliver power to the information handling system, some ports may receive power from the information handling system, and some ports may either receive or deliver power to the information handling system depending on the type of device that is coupled to the port. Ports of an information handling system may be coupled together, such as to a single node of the power system, to facilitate power delivery and receipt. However, when ports capable of receiving power are coupled to ports capable of delivering power, protection may be needed to protect against application of power to an external device receiving power from an information handling system exceeding a tolerance, such as a voltage, current, or power tolerance, of the external device or port. For example, an over-voltage condition may occur when power is delivered from an external device to a first port and flows from the first port to other ports of the information handling system. If the amount of power being delivered from the external device is greater than a tolerance of the other ports or devices coupled to the other ports, such a condition may damage the other ports and/or the external devices coupled to those ports.

Because application of a voltage or current to a port beyond certain tolerances may damage the port or an external device coupled to the port, redundancy in protection circuitry may be desirable. With redundant protections in place, if a protection component fails, the system and external peripherals may still be protected from damage that may result from over-voltage conditions. For example, instead of coupling a single cutoff switch to each port, for cutting off the port when the information handling system is not receiving power from the port, multiple switches may be coupled in series to provide for redundancy if a single switch fails. However, adding multiple redundant power switches to an information handling system can take up space and increase power dissipation and cost of an information handling system. In some embodiments of this disclosure, logic circuitry at one port may detect a failure at one port and control another port to provide redundant protection. That is, rather than provide additional redundancy of identical protection circuitry at a single port, the redundancy for one port can be provided by circuitry at another port. This reduces the amount of protection circuitry at each port, and thus reduces the cost, power dissipation, and size of the information handling system.

For example, an apparatus, such as an information handling system or power system of an information handling system, with multiple ports may detect over-voltage conditions and disconnect external devices in response to detection of such conditions. An apparatus may include a first port configured to provide a power path for coupling a first external device to an information handling system and a second port configured to provide a power path for coupling a second external device to the information handling system. The first and second ports may include, for example, USB Type-C ports, capable of both receiving power from external devices and delivering power to external devices, or barrel power connectors for receiving power from an external power adaptor. The first port and the second port may be coupled together and may be further coupled to a charger of the information handling system. The first external device may, for example, be a device coupled to the information handling system in a high-power mode to deliver power to the information handling system. The second external device may be coupled to the information handling system in a low-power mode to receive power from the information handling system.

The second port may be configured to monitor its power path for an over-voltage condition. For example, and over-voltage detector may be coupled to the second port to monitor the power path of the second port for an over voltage condition. Such a condition may occur due to a failure of a switch of the second port, such as a DC-blocking power metal-oxide-semiconductor field-effect transistor (MOSFET), to protect the second port from reverse current from the first port. When such a condition is detected, the second port may turn off a switch of the first port, such as a power MOSFET, decoupling the first external device from the information handling system. For example, an over voltage detector coupled to the second port may turn off the switch of the first port. The switch of the first port that is turned off may be a soft-start MOSFET. In decoupling the first external device, the second port may disconnect power delivered to the system from the first external device, thus protecting the second port from damage resulting from an over-voltage condition. For example, turning off the switch of the first port in response to detection of an over-voltage condition may block reverse current to the second device coupled to the second port.

The first port may also monitor its power path for an over-voltage condition. For example, the second port may be coupled to an external power delivering device while the first port may be coupled to an external device receiving power from the information handling system. A switch for protecting the first port from reverse current, such as a DC-blocking power MOSFET, may fail, causing an over-voltage condition to appear on the first port. When such a condition is detected, the first port may turn off a switch of the second port, such as a power MOSFET, decoupling the second external device. The switch of the second port that is turned off may be a soft-start MOSFET. In doing so, the first port may protect itself and devices coupled to the first port from damage that could be caused by the over-voltage condition.

Information handling systems may also include batteries that may receive power from or deliver power to external devices, in addition to powering information handling systems themselves. For example, the apparatus described above may include a battery coupled to the first port and the second port, such as by a battery charger coupled to the battery and the first and second ports. A battery switch may be coupled between the first and second ports and the battery. An over-voltage condition at one or both of the first port and the second port may occur due to a failure of the charger and, possibly, one or more switches of the first and second ports. The first and second ports may control the battery switch and turn off the switch upon detection of an over-voltage condition at one of the ports, to prevent reverse current from the battery onto one or both of the ports. Multiple redundant switches to disconnect ports and batteries may be included in the apparatus, to protect the ports from reverse current when an over-voltage condition is detected. Alternatively, single switches at the first port, the second port, and the battery may be turned off upon detection of an over-voltage condition to protect the ports and devices connected thereto from reverse current.

An information handling system may begin a method of protecting ports from potential reverse current upon detection of an external device coupled to a first port in a high-power mode, for delivering power to the information handling system. When such a device is detected, a switch, between the first port and a second port of the information handling system may be turned off, allowing current to flow from the external device coupled to the first port to the information handling system, but preventing reverse current to the second port of the information handling system. If the system has multiple ports, switches on each of the ports not coupled to the external device in the high-power mode may be turned off to prevent reverse current on all ports. For example, a port controller of a first port may turn off a switch of the second port when the first port is in a high power mode to block reverse current to the second port.

If the switch blocking reverse current to the second port fails, an over-voltage condition at the second port may be detected. When the over-voltage condition is detected, another switch coupled between a first port of the system and a second port of the system may be turned off to block reverse current to the second port. For example, the switch may decouple the external device from the information handling system, disconnecting all power from flowing from the device to the information handling system.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
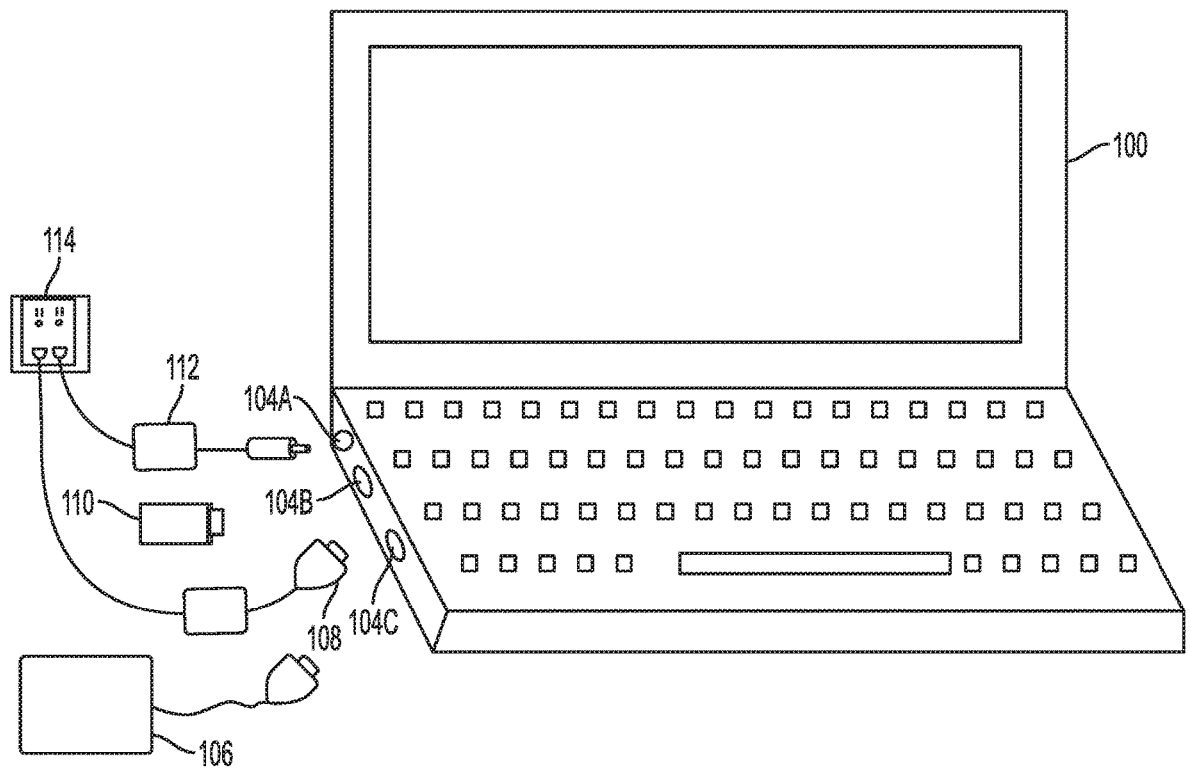
FIG. 1 is a perspective view of an information handling system with multiple ports for coupling to external devices according to some embodiments of the disclosure.

Information handling systems may include one or more ports for coupling to external devices. An example information handling system 100 with an array of external devices is illustrated in FIG. 1. An information handling system 100 may include multiple ports 104A-C. For example, an information handling system may contain barrel power connector ports, such as port 104A, USB-C ports such as ports 104B-C, or other ports, such as USB-A, Thunderbolt, mini-display and other ports for coupling external devices to the information handling system 100. Some ports, such as USB-C ports 104B-C may be capable of operating both in a high-power mode and a low-power mode. In a high-power mode the port may receive power, for example up to a wattage greater than 100 W and voltages greater than 20V, from external devices. In a low-power mode, such as a 5V power delivery mode, the port may deliver power to external devices. Other ports, such as barrel power connector port 104A may be capable of operating in a single mode to receive power from an external device, or multiple high-power modes to receive multiple different levels of power from external devices. Still other ports, such as USB 2.0 ports, may be capable of operating in a single mode, such as a low-power mode, to deliver power to external devices. Port 104A may couple to an external device such as barrel power adaptor 112, and may receive power from below 30 W to over 240 W through the barrel power adaptor. For example, the information handling system may receive power from barrel power adaptor 112 coupled between port 104A and an AC wall outlet 114. Ports 104B-C may couple to external devices such as USB-C flash memory 110, external hard drive 106, USB-C power adaptor 108, an external battery, an external keyboard, an external mouse, a USB key, or other external device. For example, the information handling system 100 may receive power from AC wall outlet 114 through USB-C power adaptor 108 coupled between AC wall output 114 and port 104B. Simultaneously, the system 100 may deliver power to external hard drive 106 coupled to port 104C. Although only three ports are illustrated, the information handling system may transmit power to and receive power from additional devices coupled to the system through additional ports such as USB-C ports, barrel power adaptor pots, magnetic power ports, USB ports, Thunderbolt ports, and other kinds of ports. Thus, an information handling system may both transmit power to and receive power from external devices coupled to ports of the information handling system.

Figure 2:
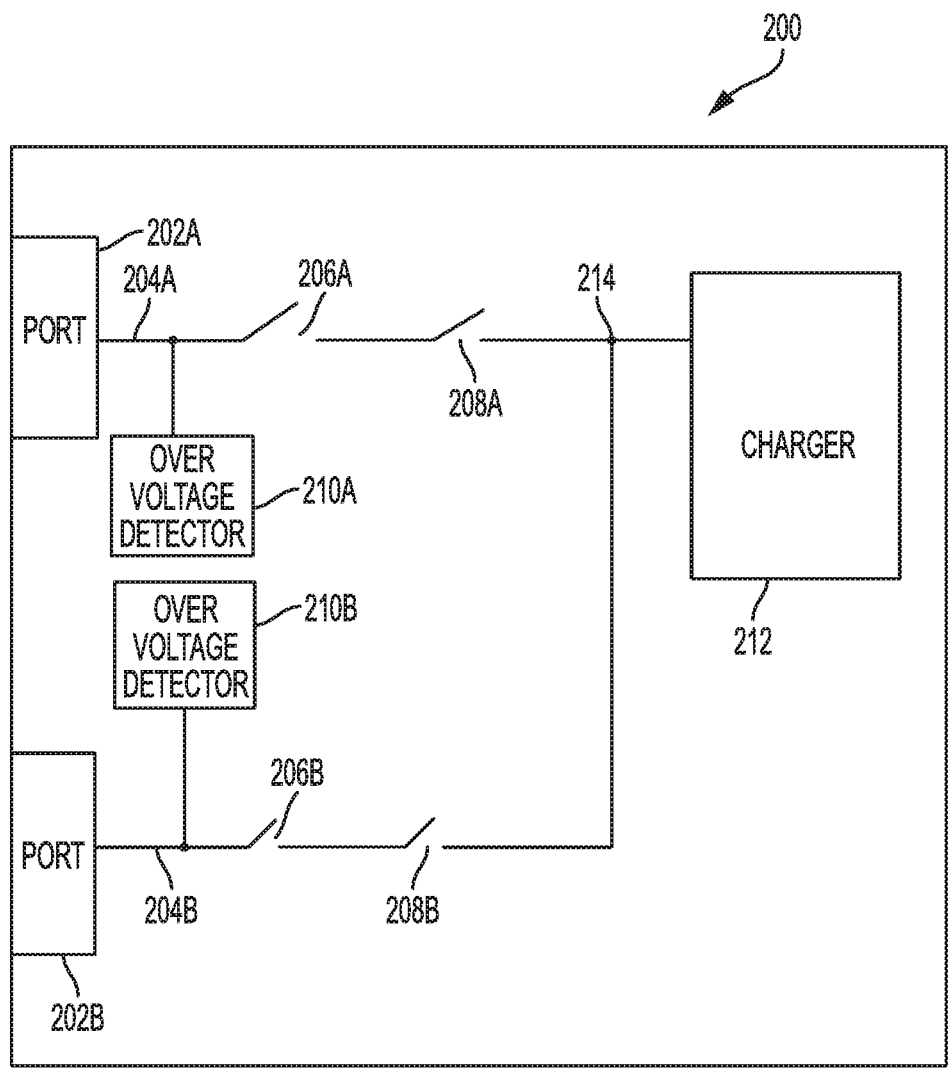
FIG. 2 is a circuit diagram illustrating a port power control system of an information handling system according to some embodiments of the disclosure.

Ports of an information handling system, capable of sending and/or receiving power, may be coupled together within the information handling system. For example, ports of an information handling system may be coupled to a common power node for receiving power from such ports. When multiple ports capable of receiving power from and/or delivering power to external devices are coupled together, such as to a common internal power node, power protection circuitry may be used to prevent reverse current from flowing from power delivering devices coupled to a first port to other ports of the information handling system. For example, some ports may have tolerances of 30V, 8 A, and 100 W and exceeding any of the tolerances may cause damage to the port and/or any external devices coupled thereto. Multiple levels of protection may be implemented to provide redundant protection if a power protection component fails. For example, an information handling system may be equipped with two levels of protection to make the system single-fault tolerant. An example port power control system of an information handling system 200 is illustrated in FIG. 2. An information handling system 200 may include two or more ports such as first port 202A and second port 202B. The ports 202A-B may be capable of delivering power to the information handling system 200 from external devices, delivering power from the information handling system 200 to power external devices, or both delivering power from the information handling system 200 to external devices and delivering power from the external devices to the information handling system. For example, ports 202A-B may be barrel power connector ports, USB-C ports, USB-A ports, Thunderbolt ports, or other information handling system ports.

Power transfer at the ports 202A-B may be controlled by a series of switches. For example, a first power bus 204A may couple the first port 202A to a node 214. The second port 202B may be coupled to the node 214 via a power bus 204B. The node 214 may be coupled to a charger 212, to receive power from the first port 202A and the second port 202B for powering the information handling system 200. The charger 212 may be a narrow voltage direct current (NVDC) buck boost charger, a hybrid charger, or other circuitry configured to interface the ports with a battery. A first switch 206A may be coupled between the port 202A and the node 214. Switch 206A may be a transistor, such as a soft-start MOSFET for coupling the first port 202A to the information handling system when coupled to an external power delivering device. For example, switch 202A may provide a gradual ramp up of current from port 202A when an external power delivering device is coupled to the port 202A. Switch 206A may be biased toward port 202A to prevent current from flowing from the port 202A when the switch 206A is turned off. For example, when an external power delivering device is coupled to the port 202A, switch 206A may turn on to allow current to flow from the port 202A to the charger 212. Another switch 208A, such as a direct current (DC) blocking MOSFET, may be coupled between switch 206A and node 214. Switch 208A may be turned off when a power delivering external device is coupled to port 202B to prevent reverse current from the external device at port 202B from flowing to port 202A and damaging any devices coupled to port 202A. When no device is coupled to port 202A, or when a device is coupled to the port 202A in a low-power mode, both switch 206A and switch 208A may be turned off, to prevent current from flowing to or from port 202A via node 214. Switch 208A may include a diode (not shown), such as a Schottky diode, coupled in parallel to a transistor to allow current to flow from the port 202A to the node 214, when the transistor is turned off.

A similar configuration of switches may couple the second port 202B to the node 214. Port 202B may be coupled to the node 214 via a switch 206B, such as a soft-start MOSFET for coupling the second port 202B to the information handling system when coupled to an external power delivering device. For example, switch 202B may provide a gradual ramp up of current from port 202B when an external power delivering device is coupled to the port 202B. Switch 206B may be biased toward port 202B to prevent current from flowing from the port 202B when the switch 206B is turned off. Another switch 208B, such as a DC blocking MOSFET, may be coupled between switch 206B and node 214. Switch 208B may be turned off when a power delivering external device is coupled to port 202A to prevent reverse current from the external device at port 202A from flowing to port 202B and damaging any devices coupled to port 202B. When no device is coupled to port 202B, or when a device is coupled to the port 202B in a low-power mode, both switch 206B and switch 208B may be turned off, to prevent current from flowing to or from port 202B via node 214. Switch 208B may include a diode (not shown), such as a Schottky diode, coupled in parallel to a transistor to allow current to flow from the port 202B to the node 214, even when the transistor is turned off.

Each of the ports 202A-B may include over-voltage detectors 210A-B to detect over-voltage conditions. For example, an over-voltage detector 210A may be coupled to bus 204A between port 202A and switch 206A; an over-voltage detector 210B may be coupled to bus 204B between port 202B and switch 206B. The over-voltage detectors 210A-B may, for example, be circuits for monitoring voltage levels at the ports to determine if the voltage levels exceed an over-voltage threshold. For example, the over-voltage detectors 210A-B may monitor for voltages at ports 202A-B greater than a voltage, such as 5V, that is expected at a port or for voltages outside a predetermined voltage range. The over-voltage detectors 210A-B may control switches 206A-B and may open the switches 206A-B to disconnect current when an over-voltage condition is detected. For example, if either of switches 208A or 208B fail while another port is coupled to an external power delivering device in a high-power mode one of the ports 202A-B may be subjected to an over-voltage condition and reverse current from the other port may damage the port and/or an external device coupled to the port. For example, when port 202A is coupled to an external power delivering device in a high-power mode and port 202B is coupled to an external power consuming device in a low-power mode, if switch 208B fails, reverse current from the external power delivering device coupled to port 202A may flow from the device to port 202B causing an over-voltage condition at the port 202B. The over-voltage detector 210B may detect an over-voltage condition at port 202B and may turn off switch 206A of port 202A, decoupling the external power delivering device from the information handling system and preventing damage to port 202B and the power consuming device. Over-voltage detector 210A may similarly protect port 202A and devices coupled thereto.

Figure 3:
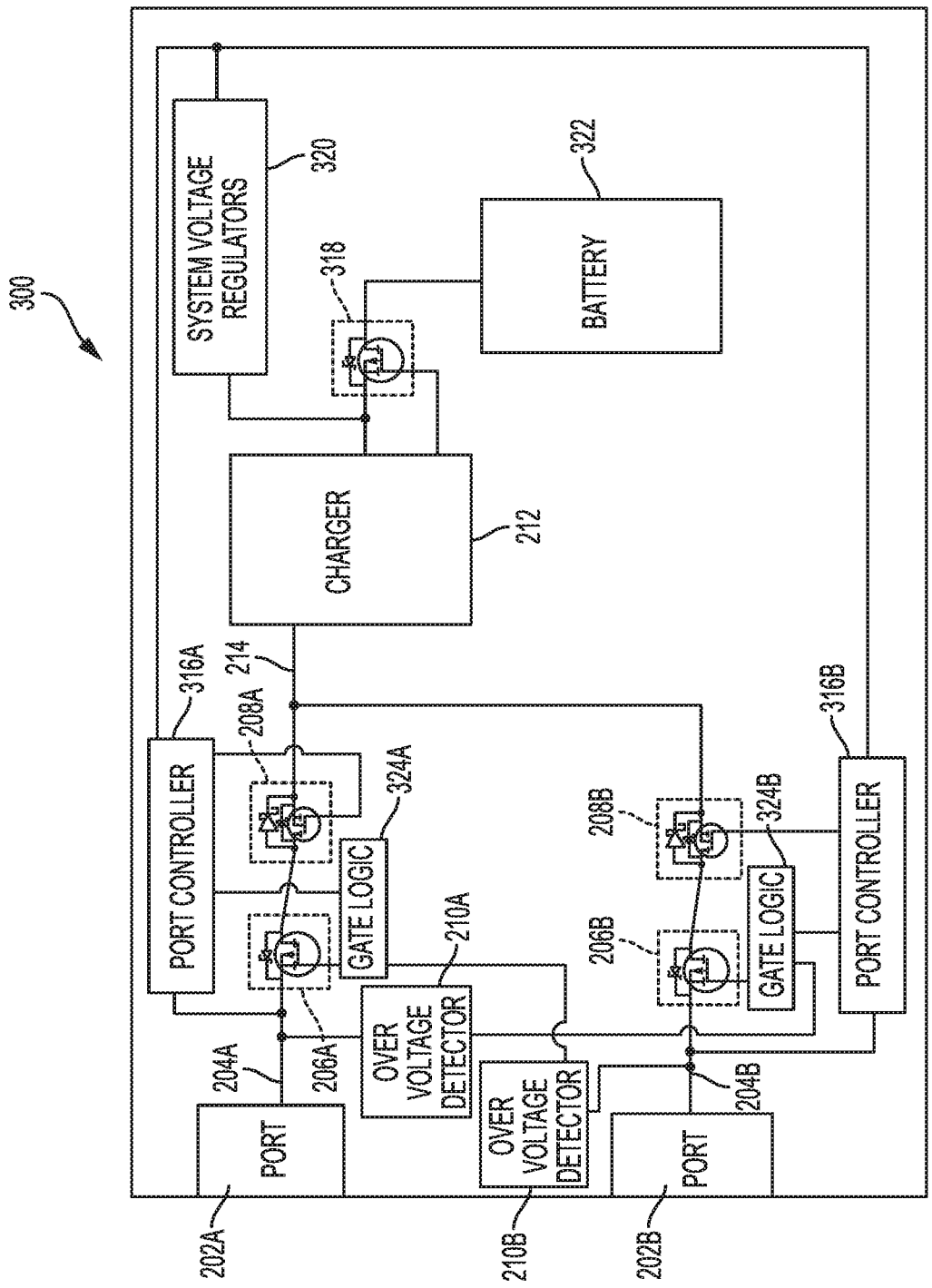
FIG. 3 is a circuit diagram illustrating a power distribution system of an information handling system according to some embodiments of the disclosure.

Ports of an information handling system and devices connected thereto may be protected from reverse current from power delivering devices coupled to other ports of the information handling system. Switches of the system may be controlled to receive power from external devices, deliver power to external devices, prevent reverse current from flowing to ports, and to disconnect external power delivering devices when reverse current protection measures fail. An information handling system 300 may include two ports 202A-B, such as barrel power connector ports, USB-C ports, USB ports, Thunderbolt ports, or other information handling system ports, for coupling the information handling system to external devices, as illustrated in FIG. 3. The ports 202 A-B may be capable of coupling to external devices in a high-power mode, to receive power from the external devices, in a low-power mode, to deliver power to the external devices, or in both high-power and low-power modes, depending on a mode of a device coupled to the port.

The ports 202A-B may deliver power to external devices. For example, port controllers 316A-B for each of the ports 202A-B may control power delivered to and power received from external devices through the ports 202A-B. Alternatively, a single controller may control power delivered to and received from ports 202A-B. Ports 202A-B, and any additional ports of the information handling system 300, may be further controlled by a power system embedded controller. The power system embedded controller may work with the port controllers 316A-B and the over-voltage detectors 210A-B to control switches 206A-B and 208A-B. For example, the embedded controller may provide timing signals and other control signals to switch control logic. The port controllers 316A-B may each be coupled to an output of system voltage regulators 320 to receive power for delivery to the ports 202A-B in a low-power mode. For example, when an external device is coupled to port 202A in a low-power mode, port controller 316A may receive power from system voltage regulators 320 and provide power to bus 204A to be delivered to an external device coupled to port 202A. In this mode, the port controller 316A may also communicate with gate logic 324A to turn off switch 206A to prevent current backflow from power delivered to the port 202A via the port controller 316A to node 214.

The ports 202A-B may also be capable of receiving power from external devices in a high-power mode. When an external device is coupled to one of the ports 202A-B in a high-power mode, to deliver power to the information handling system 300, the port controllers 316A-B may control the switches 206A-B, 208A-B of the ports 202A-B to receive power from the external device and to prevent current backflow to any other ports. For example, if an external device is coupled to port 202A in a high-power mode, while another external device is coupled to port 202B in a low-power mode, the port controllers 316A-B may act to supply power to port 202B, receive power from port 202A, and prevent reverse current from flowing from port 202A to port 202B. Port controller 316A may turn on switches 206A, for example through gate logic 324A, and 208A to allow current to flow from port 202A to node 214 and to charger 212. Charger 212 may then supply power received from the external device coupled to port 202A to system voltage regulators 320, for powering the information handling system, and to battery 322, through switch 318, for charging battery 322. System voltage regulators 320 may include a 5V and/or 3V voltage regulator for providing power to ports 202A-B, and any other ports that may be coupled to power consuming devices, and may also include one or more voltage regulators for providing power to components of the information handling system 300 such as a display, processor, memory, fans, and other information handling system components. Port controller 316B may turn off switch 206B, through gate logic 324B, and switch 208B to prevent current from flowing from the port 202B to node 214 and to prevent reverse current from flowing from the port 202A to the port 202B. Port controller 316B may also deliver power to port 202B to power the external power consuming device coupled to port 202B.

Over-voltage detectors 210A and 210B may be coupled to busses 204A and 204B, respectively, to monitor for over-voltage conditions at the ports 202A-B. For example, in a configuration where an external device is coupled to port 202A in a high-power mode and an external device is coupled to port 202B in a low-power mode, if switch 208B fails, allowing reverse current to flow from port 202A to port 202B, over-voltage detector 210B may detect an over-voltage condition at port 202B. In response, over-voltage detector 210B may communicate with gate logic 324A to turn off switch 206A, preventing reverse current from flowing from port 202A to port 202B. Turning off switch 206A may decouple the external device coupled to port 202A from the information handling system 200.

Port controllers 316A-B of ports coupled to external devices in a high-power mode may deactivate over-voltage detectors 210A-B monitoring for over-voltage conditions at ports 202A-B. For example, when port 202A is coupled to an external device in a high-power mode, port controller 316A may deactivate over-voltage detector 210A, as the port 202A is operating in a high-power mode. Alternatively, another controller of the information handing system 300 may deactivate over-voltage controllers 210A-B.

Figure 4:
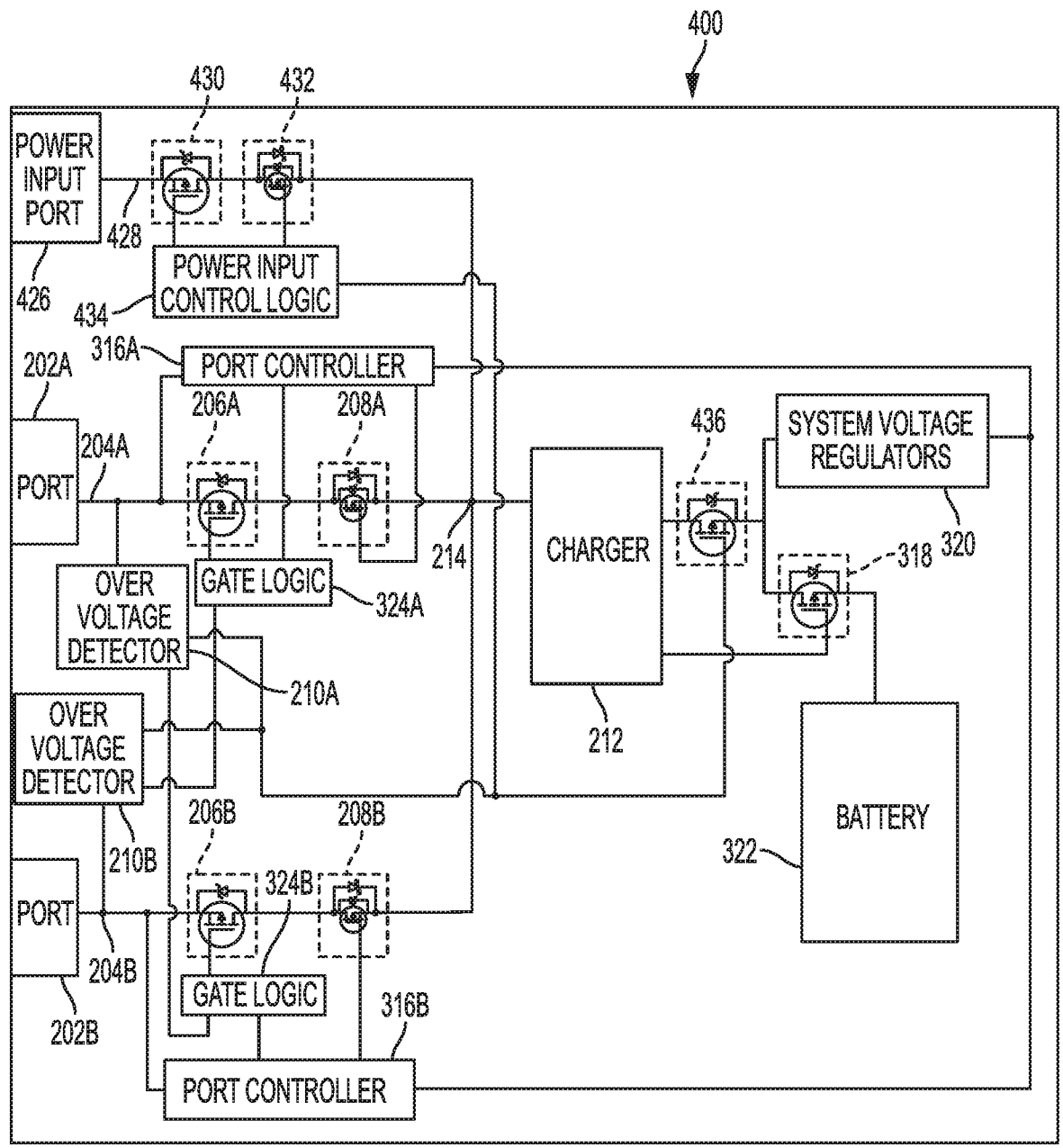
FIG. 4 is a circuit diagram illustrating a power distribution system of an information handling system according to some embodiments of the disclosure.

Information handling systems may have more than two ports for receiving and delivering power. For example, an information handling system 400, as illustrated in FIG. 4 may have a third port 426 for receiving power input from an external device. Although only three ports are illustrated in FIG. 4, an information handling system may have further additional ports capable of receiving power, delivering power, or both receiving and delivering power, to and from external devices coupled thereto. If multiple external power delivering devices are coupled to ports of the information handling system 400, the information handling system 400 may select a single port from which to accept power and may disconnect the remaining ports. Power input port 426 may be a barrel power connector port, such as a 4.5 millimeter or 7.4 millimeter barrel power connector port, for coupling to and receiving power from an external barrel power adaptor. Power input port 426 may be configured to receive power from an external electronic device in a high-power mode, or may be configurable to operate in one of a plurality of high-power modes, each mode operating at a different input voltage. The power input port 426 may be coupled to node 214 via a power bus 428. Node 214, may be coupled to port 202A, port 202B, and charger 212. A switch 430 may be coupled between the power input port 426 and the node 214. The switch 430 may be biased towards the power input port. Another switch 432 may be coupled between the switch 430 and the node 214. The switch 432 may be biased away from the power input port and may, optionally, have a diode coupled in parallel to a transistor of the switch 432. The diode of switch 432 may be biased away from the power input port 426 to allow current to flow from the port 426 to the charger 212, even when a transistor of the switch 432 is turned off.

The first and second switches 430, 432 of the power input port 426 may be controlled by a power input control logic 434. For example, the first and second switches may be turned on when an external power delivering device, such as a 90 W, non-limited power source (LPS) compliant power adaptor, is coupled to the power input port 426 to deliver power to the information handling system 400. The switches 430, 432 may also be controlled to turn off and disconnect an external power delivering device when an external power input device exceeding a maximum power tolerance of the power input port 426 is coupled thereto. Over-voltage detectors 210A-B may also be coupled to power input control logic 434 to turn off switch 430 when an over-voltage condition is detected at port 202A and/or port 202B to prevent reverse current from flowing from power input port 426 to ports 202A-B and to decouple the external power delivering device coupled to port 426 from the information handling system 400. The power input control logic 434 may include a power system microcontroller, a port controller, and other power input logic components.

Over-voltage conditions detected on one or more ports of an information handling system may also be caused by reverse current from a battery of an information handling system. For example, if charger 212 fails, reverse current may flow from the battery 322 to ports 202A-B. In some embodiments, reverse current may also flow to port 426. Charger 212 may be a buck boost NVDC charger, a hybrid boost charger, or the like. The over-voltage detectors 210A-B may detect over-voltage conditions resulting from reverse current from the battery 322 through the charger 212 and to port 202A, port 202B, and/or port 426. For example, if charger 212 fails and switches 206A-B, 208A-B, 430, 432 between ports 202A-B and 426 and the charger 212 either fail or are turned on to conduct current, reverse current may flow from the battery 322 to port 202A, port 202B, and/or port 426. When an over-voltage condition is detected at one of ports 202A-B, by one or both over-voltage detectors 210A-B, the over-voltage detectors 210A-B may turn off switch 436, decoupling the battery 322 from the ports 202A-B, 426 and blocking reverse current to ports 202A-B, 426.

Figure 5:
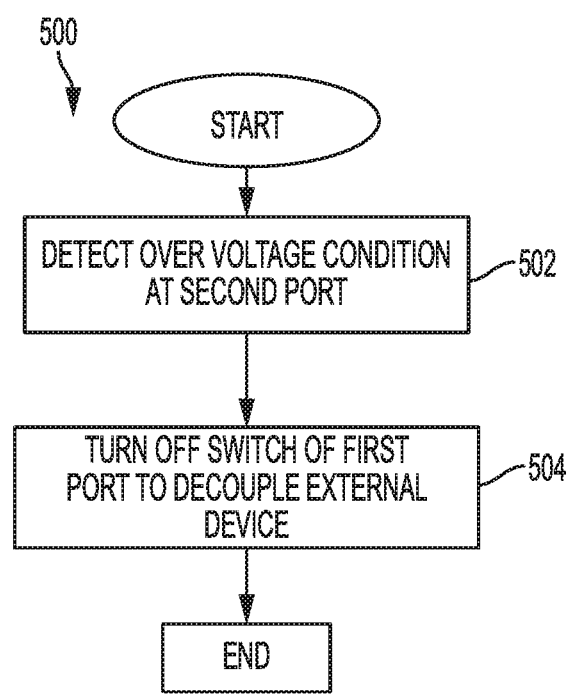
FIG. 5 is a flow chart illustrating an example method for protecting a port from reverse current according to some embodiments of the disclosure.

External devices coupled to ports of an information handling system may be damaged if power exceeding the physical tolerances of such devices, such as a maximum current or voltage to which the external device may be exposed, is applied. An example method 500 for protecting a port from damage resulting from reverse current in excess of a tolerance of a device coupled to the port or of the port itself is illustrated in FIG. 5. The method may begin with detection of an over-voltage condition at a second port of an information handling system, at step 502. For example, a voltage greater than a threshold voltage may be detected by an over-voltage detection circuit.

When an over-voltage condition is detected, a switch of a first port may be turned off, at step 504, to decouple an external device, coupled to the first port, from the information handling system. An external power delivering device, such as a power adaptor, coupled to the first port, may be disconnected to block reverse current to the second port of the information handling system. If the information handling system has more than two ports, switches for each of the ports at which the over-voltage condition did not occur may be turned off to decouple all external devices from which reverse current may flow to the second port.

Figure 6:
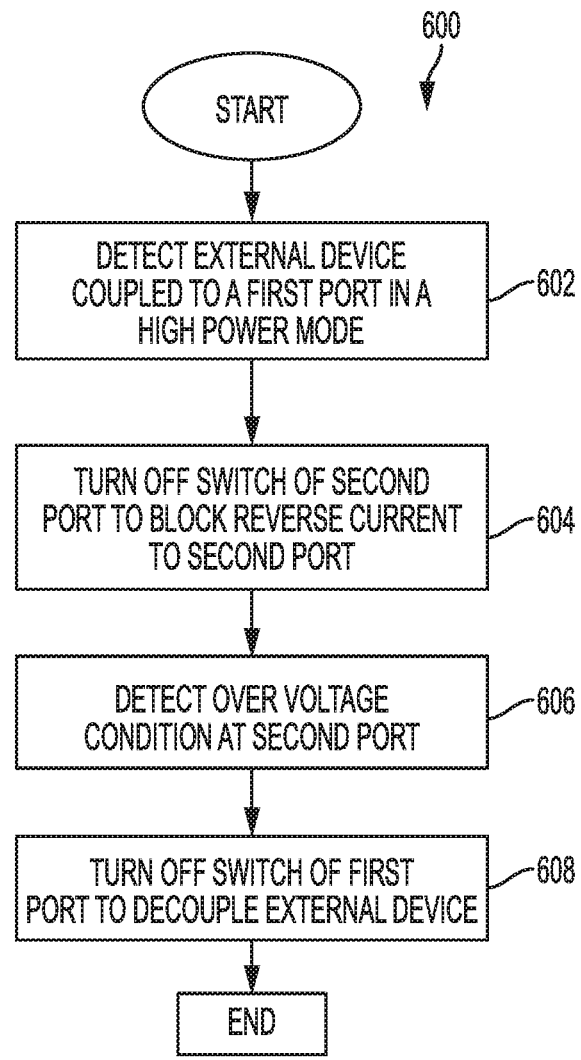
FIG. 6 is a flow chart illustrating an example method for protecting a port from reverse current according to some embodiments of the disclosure.

An information handling system may couple to external devices in a high voltage mode to receive power from the external devices. A fault may occurs in a power protection component of the information handling system, such as a short causing current to bypass a power protection switch. The fault causes an over-voltage condition at one or more ports, and the information handling system may disconnect one or more external devices to protect its ports and other external devices from reverse current. An example method 600 for coupling to an external device in a high-power mode and protecting other external devices coupled to the system from reverse current is illustrated in FIG. 6. The method may begin with detecting an external device, at step 602 coupled to a first port in a high-power mode. For example, a power adaptor may be coupled to the first port in a high-power mode to deliver power to the information handling system.

When an external device is detected, a second switch of a second port of the information handling system may be turned off to block reverse current to the second port. For example, switch 208B of port 202B may be turned off to block reverse current from flowing from port 202A to port 202B. Switch 432 of port 426 may also be turned off to block reverse current from flowing from port 202A to port 426.

At step 606, an over-voltage condition may be detected at the second port. Such a condition may be caused by a failure of the second switch, allowing reverse current to flow from the first port to the second port creating an over-voltage condition and potentially damaging the second port and devices connected thereto. For example, a failure of switch 208B may allow reverse current to flow from port 202A to port 202B. Alternatively or additionally, a failure of switch 208A or 208B may allow reverse current to flow from port 426 to port 202A and port 202B, respectively. An over-voltage condition at port 202A may be detected by over-voltage detector 210A, and an over-voltage condition at port 202B may be detected by over-voltage detector 210B.

When an over-voltage condition is detected, at the second port, a switch of the first port may be turned off, at step 608, to decouple an external electronic device coupled to the first port from the information handling system. Decoupling the external electronic device may prevent reverse current from flowing from the first port to the second port. For example, switch 206A of port 202A may be turned off to decouple an external device coupled to port 202A from the information handling system 400, to prevent reverse current from flowing from port 202A to port 202B. Alternatively or additionally, switch 430 of port 426 may be turned off to decouple an external device coupled to port 426 from the information handling system 400 to prevent reverse current from flowing from port 426 to either of ports 202A-B.

Figure 7:
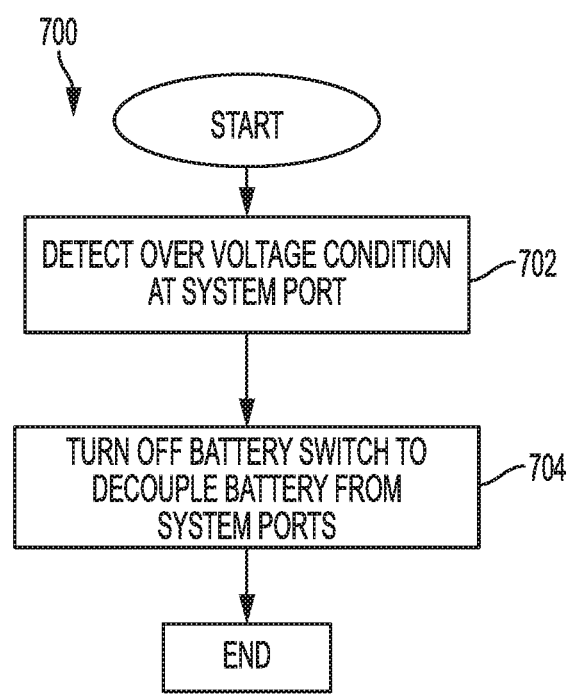
FIG. 7 is a flow chart illustrating an example method for protecting system ports from reverse current from a system battery according to some embodiments of the disclosure.

Reverse current may also flow from internal system components, such as a system battery, causing over-voltage conditions at the ports. A method 700 for decoupling a battery from one or more ports of an information handling system is illustrated in FIG. 7. The method 700 may begin with detecting an over-voltage condition at a system port, at step 702. For example, such a condition may be caused by a failure of charger 212, to prevent reverse current from a battery 322 to port 202A, port 202B, and/or port 426 of an information handling system 400. Such a condition may also be caused by failure of one or more switches of the information handing system to protect one or more ports from reverse current such as switch 208A, switch 208B, and/or switch 432. An over-voltage condition at port 202A may be detected by over-voltage detector 210A, and an over-voltage condition at port 202B may be detected by over-voltage detector 210B. Optionally, an over-voltage detector may also be coupled to port 426 to detect an over-voltage condition.

When an over-voltage condition is detected, a battery switch of the information handling system may be turned off, at step 704, to decouple the battery from the system ports. For example, when voltage detector 210A and/or voltage detector 210B and/or a voltage detector of port 426 detects an over-voltage condition at one or all of ports 202A-B and 426, battery switch 436 may be turned off to decouple the battery 322 from ports 202A-B and 426, thus preventing reverse current from flowing from the battery 322 to one or more of the ports 202A-B and 426.

The schematic flow chart diagram of FIGS. 5-7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

As used herein, when two or more elements are referred to as "coupled" to one another, such term indicates that such two or more elements are in electronic communication or mechanical communication, as applicable, whether connected indirectly or directly, with or without intervening elements.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a first port configured to provide a first power path for coupling a first external device to an information handling system;
   a second port configured to provide a second power path for coupling a second external device to the information handling system; and
   a first over-voltage detector coupled to the second port, wherein the first over-voltage detector is configured to monitor the second power path for an over-voltage condition and, when the over-voltage condition is detected, turn off a first switch of the first port to decouple the first external device from the information handling system.

2. The apparatus of claim 1, wherein the first over-voltage detector is configured to block reverse current from the first external device to the second external device by turning off the switch, and wherein the first over-voltage detector is configured to monitor the second power path for a failure of a second switch of the second port by detecting an over-voltage condition on the second power path.

3. The apparatus of claim 2, wherein the first switch comprises a soft-start power metal-oxide-semiconductor field-effect transistor (MOSFET), and wherein the second switch comprises a DC-blocking MOSFET.

4. The apparatus of claim 2, further comprising a port controller coupled to the first port, wherein the port controller is configured to turn off the second switch of the second port when the first port is coupled to the first external device in a high-power mode.

5. The apparatus of claim 1, further comprising a second over-voltage detector coupled to the first port, wherein the second over-voltage detector is configured to monitor the first power path for an over-voltage condition and, when the over-voltage condition of the first power path is detected, turn off a second switch of the second port to decouple the second external device.

6. The apparatus of claim 5, further comprising a port controller coupled to the first port, wherein the port controller is configured to detect the external device coupled to the first port in a high-power mode and to deactivate the second over-voltage detector when the external device is coupled to the first port in the high-power mode.

7. The apparatus of claim 1, wherein the first port comprises a USB type-C port and the second port comprises a USB type-C port.

8. The apparatus of claim 1, wherein the first port comprises a barrel power connector.

9. The apparatus of claim 1, further comprising a battery and a second switch coupled between the battery and the first and second ports, wherein the first over-voltage detector is configured to turn off the second switch when the over-voltage condition is detected, to prevent reverse current from flowing from the battery to the first port or the second port.

10. An information handling system, comprising:
    a battery;
    a charger coupled to the battery;
    a first port coupled to the charger and to the second port;
    a second port coupled to the charger and to the first port;
    a first over-voltage detector coupled to the second port; and
    a first switch coupled to the first port configured to block reverse current to the second port,
    wherein the first over-voltage detector is configured to turn off the first switch when the first over-voltage detector detects an over-voltage condition at the second port.

11. The information handling system of claim 10, wherein turning off the first switch blocks reverse current from a first device coupled to the first port to a second device coupled to the second port.

12. The information handling system of claim 10, further comprising:
    a second over-voltage detector coupled to the first port; and
    a second switch coupled to the second port configured to block reverse current to the first port,
    wherein the second over-voltage detector is configured to turn off the second switch when the second over-voltage detector detects an over-voltage condition at the first port.

13. The information handling system of claim 10, further comprising a second switch coupled to the second port, wherein the first over-voltage detector is configured to turn off the first switch to decouple a first external device coupled to the first port, when the first over-voltage detector detects an over-voltage condition at the second port due to a failure of the second switch.

14. The information handling system of claim 13, wherein the first switch comprises a soft-start power metal-oxide-semiconductor field-effect transistor (MOSFET), and wherein the second switch comprises a DC blocking MOSFET.

15. The information handling system of claim 13, further comprising a port controller coupled to the first port, wherein the port controller is configured to turn off the second switch of the second port when the first port is coupled to an external device in a high-power mode, to block reverse current to the second port.

16. The information handling system of claim 10, wherein the first port comprises a USB type-C port and the second port comprises a USB type-C port.

17. The information handling system of claim 10, further comprising a second switch coupled between the battery and the first and second ports, wherein the first over voltage detector is configured to turn off the second switch when the over-voltage condition is detected, to prevent reverse current from flowing from the battery to the first or second ports.

18. A method, comprising:
detecting an over-voltage condition at a second port of an information handling system; and
when the over-voltage condition is detected, turning off a first switch coupled between a first port of the information handling system and the second port to block reverse current from the first port to the second port.

19. The method of claim 18, further comprising:
detecting an external device coupled to the first port in a high-power mode; and
when the external device is detected, turning off a second switch coupled between the first port and the second port of the information handling system to block reverse current to the second port while allowing power to be delivered to the information handling system from the device coupled to the first port.

20. The method of claim 18, wherein turning off the first switch comprises decoupling the external device coupled to the first port of the information handling system from the information handling system.

* * * * *